(12) United States Patent
Roy et al.

(10) Patent No.: US 7,660,877 B2
(45) Date of Patent: *Feb. 9, 2010

(54) SYSTEMS AND METHODS IN WHICH A PROVIDER IS SELECTED TO SERVICE CONTENT REQUESTED BY A CLIENT DEVICE

(75) Inventors: Sumit Roy, Menlo Park, CA (US); Bo Shen, Fremont, CA (US); John Ankcorn, Palo Alto, CA (US); John Apostolopoulos, Palo Alto, CA (US); Michele Covell, Palo Alto, CA (US); Michael Harville, Palo Alto, CA (US); Wai-tian Tan, Sunnyvale, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1034 days.

This patent is subject to a terminal disclaimer.

(21) Appl. No.: 10/698,810

(22) Filed: Oct. 30, 2003

(65) Prior Publication Data

US 2004/0236854 A1 Nov. 25, 2004

Related U.S. Application Data

(60) Provisional application No. 60/471,851, filed on May 19, 2003.

(51) Int. Cl.
*G06F 15/16* (2006.01)

(52) U.S. Cl. .................. 709/219; 709/203; 709/224; 709/227

(58) Field of Classification Search .......... 709/203, 709/223–224, 217–219, 227–228, 231–234
See application file for complete search history.

(56) References Cited

U.S. PATENT DOCUMENTS

| 5,694,537 | A | * | 12/1997 | Montenegro et al. .......... 714/12 |
| 5,928,325 | A | | 7/1999 | Shaughnessy et al. |
| 5,937,388 | A | | 8/1999 | Davis et al. |
| 6,055,433 | A | | 4/2000 | Yuan et al. |
| 6,101,547 | A | | 8/2000 | Mukherjee et al. |

(Continued)

FOREIGN PATENT DOCUMENTS

| EP | 1035718 A1 | 9/2000 |
| JP | 2001117809 | 4/2001 |
| JP | 2002091843 | 3/2002 |
| WO | WO02/058396 | 7/2002 |

OTHER PUBLICATIONS

Antony Pranata,"Development of Network Service Infrastructure For Transcoding Multimedia Streams", Master Thesis at University of Stuttgart, Germany, May 2002.*

(Continued)

*Primary Examiner*—Philip B Tran (57) ABSTRACT

Methods and systems for servicing content for delivery to a client device are described. An item of content is identified during a session with the client device. A type of service to be performed on the item of content is identified. A provider is selected from a plurality of providers capable of performing the service. The session is transferred to the selected provider, which performs the service on the item of content.

34 Claims, 5 Drawing Sheets

U.S. PATENT DOCUMENTS

| | | | |
|---|---|---|---|
| 6,211,902 | B1 | 4/2001 | Tanoi |
| 6,247,050 | B1 * | 6/2001 | Tso et al. ............... 709/224 |
| 6,263,371 | B1 | 7/2001 | Geagan, III et al. |
| 6,407,680 | B1 | 6/2002 | Lai et al. |
| 6,421,733 | B1 | 7/2002 | Tso et al. |
| 6,442,165 | B1 | 8/2002 | Sitaraman et al. |
| 6,463,454 | B1 | 10/2002 | Lumelsky et al. |
| 6,484,212 | B1 | 11/2002 | Markowitz et al. |
| 6,516,350 | B1 | 2/2003 | Lumelsky et al. |
| 6,529,950 | B1 | 3/2003 | Lumelsky et al. |
| 6,633,560 | B1 | 10/2003 | Albert et al. |
| 6,658,000 | B1 | 12/2003 | Raciborski et al. |
| 6,665,706 | B2 | 12/2003 | Kenner et al. |
| 6,674,453 | B1 * | 1/2004 | Schilit et al. ............ 715/810 |
| 6,891,825 | B1 | 5/2005 | O'Dell et al. |
| 6,941,378 | B2 | 9/2005 | Apostolopoulos et al. |
| 6,950,407 | B1 | 9/2005 | Huddle |
| 6,954,641 | B2 * | 10/2005 | McKenna et al. ........ 455/435.1 |
| 6,959,318 | B1 | 10/2005 | Tso |
| 6,970,602 | B1 | 11/2005 | Smith et al. |
| 6,981,029 | B1 * | 12/2005 | Menditto et al. .......... 709/217 |
| 6,996,618 | B2 | 2/2006 | Apostolopoulos et al. |
| 7,171,206 | B2 * | 1/2007 | Wu ........................ 709/219 |
| 7,200,402 | B2 | 4/2007 | Apostolopoulos et al. |
| 7,277,431 | B2 | 10/2007 | Walter et al. |
| 2001/0039581 | A1 * | 11/2001 | Deng et al. ............... 709/228 |
| 2002/0013852 | A1 * | 1/2002 | Janik ........................ 709/218 |
| 2002/0021669 | A1 | 2/2002 | Kunito et al. |
| 2002/0032777 | A1 | 3/2002 | Kawata et al. |
| 2002/0056123 | A1 | 5/2002 | Liwerant et al. |
| 2002/0068558 | A1 | 6/2002 | Janik |
| 2002/0082015 | A1 | 6/2002 | Wu |
| 2002/0133597 | A1 | 9/2002 | Jhingan et al. |
| 2002/0147011 | A1 | 10/2002 | Kay |
| 2002/0152305 | A1 | 10/2002 | Jackson et al. |
| 2002/0156833 | A1 | 10/2002 | Maurya et al. |
| 2002/0174247 | A1 | 11/2002 | Shen |
| 2002/0193110 | A1 | 12/2002 | Julka et al. |
| 2003/0005078 | A1 * | 1/2003 | Turicchi et al. ........... 709/217 |
| 2003/0009577 | A1 | 1/2003 | Apostolopoulos et al. |
| 2003/0021282 | A1 | 1/2003 | Hospodor |
| 2003/0046396 | A1 | 3/2003 | Richter et al. |
| 2003/0046420 | A1 | 3/2003 | Breiter et al. |
| 2003/0065763 | A1 * | 4/2003 | Swildens et al. .......... 709/224 |
| 2003/0088686 | A1 | 5/2003 | Jennings |
| 2003/0105806 | A1 | 6/2003 | Gayle et al. |
| 2003/0143985 | A1 | 7/2003 | Yokoyama |
| 2003/0158913 | A1 | 8/2003 | Agnoli et al. |
| 2003/0163513 | A1 | 8/2003 | Schaeck et al. |
| 2003/0210682 | A1 | 11/2003 | Bais et al. |
| 2004/0015405 | A1 | 1/2004 | Cloutier et al. |
| 2004/0117427 | A1 | 6/2004 | Allen et al. |
| 2004/0139088 | A1 | 7/2004 | Mandato et al. |
| 2004/0139157 | A1 | 7/2004 | Neely, III et al. |
| 2004/1023684 | * | 11/2004 | Roy et al. ............... 709/223 |
| 2005/0015765 | A1 * | 1/2005 | Covell et al. ............. 718/100 |

OTHER PUBLICATIONS

Marcus Brunnet A.O.—"Requirements for QoS Signaling Protocols"—Draft—Nov. 2001—pp. 1-27.
Sinocdn—"Request Routing, Load-Balancing and Fault-Tolerance Solution—MediaDNS"—White Paper Apr. 2003—pp. 1-8.
Micro Masa et al—"Impact of Request Routing Algorithms on the Delivery Performance of Content Delivery Networks"—IEEE—IPCCC Apr. 2003—Conf 22—pp. 5-12.
"Internet Streaming Media Alliance Implementation Specification", Version1.0; Aug. 28, 2001; Internet Streaming Media Alliance (ISMA); 68 pages.
M. Handley et al.; "SDP: Session Description Protocol"; copyright: The Internet Society (1998); Apr. 1998; 40 pages.
Don Box, et al.; "Simple Object Access Protocol (SOAP) 1.1"; May 8, 2000; W3C; 35 pages.
H. Schilzrinne, et al.; "Real Time Streaming Protocol (RTSP)"; copyright: The Internet Society (1998); Apr. 1998; 87 pages.
H. Schilzrinne, et al.; "RTP: A Transport Protocol for Real-Time Applications"; 70 pages.
A. Babir, et al.; "Opes Use Cases and Deployment Scenarios draft-ietf-opes-scenarios-01" copyright: The Internet Society (2002); Aug. 5, 2002; 16 pages.
Elan Amir, et al.; "An Active Service Framework and its Application to Real-Time Multimedia Transcoding"; available at www.net-tech.bbn.com/smtpkts/baltimore/index.html; 12 pages.
Michael Harville, et al.; "An Architecture for Componentized, Network-Based Media Services"; Hewlett-Packard Laboratories, Palo Alto, CA; 7 pages.
Michael Harville, et al.; "An Architecture for Componentized, Network-Based Media Services" Streaming Media Systems Group, HP Labs, Palo Alto, CA ; 4 pages.
Takeshi Yoshimura, et al.; "Mobile Streaming Media CDN Enabled by Dynamic SMIL"; May 7-11, 2002; Honalulu, Hawaii; pp. 651-661.
Susie J. Wee, et al.; "Field-to-Frame Transcoding With Spatial and Temporal Downsampling"; IEEE International conference on Image Processing, Kobe, Japan, Oct. 1999; 5 pages.
Sumit Roy, et al.; "Application Level Hand-Off Support for Mobile Media Transcoding Sessions"; NOSSDAV 2002, May 12-14, 2002, Miami, Florida; 10 pages.
Sumit Roy, et al.; "Implementation of an Algorithm for Fast Down-Scale Transcoding of Compressed Video on the Itanium"; Hewlett-Packard Laboratories, Palo Alto, CA ; 8 pages.
3GPP TS 26.244 V0.1.2 (Feb. 19, 2003); 3rd Generation Partnership Project: Technical Specification Group Services and System Aspects Transparent end-to-end packet switched streaming service (PSS); 3GPP file format (3GP) (Release 6).
3GPP TS 26.234 V,5.0.0 (Mar. 2000); 3rd Generation Partnership Project: Technical Specification Group Services and System Aspects; Transparent end-to-end packet switched streaming service (PSS); Protocols and codecs (Release 5).
A. Babir, et al.; "An Architecture for Open Pluggable Edge Services (OPES) draft-letf-opes-architecture-04"; copyright: The Internet Society (2002); Dec. 11, 2002; 22 pages.
Wei Tsand Ooi et al.; "Design and Implementation of Programmable Media Gateways"; Department of Computer Science, Cornell University, Ithaca, NY; 8 pages.
Wei-Ying Ma, et al.; "Content Services Network: The Architecture and Protocols"; 9 pages.
Roger Karrer, et al.; "Dynamic Handoff of Multimedia Streams"; Institute of Computer Systems, ETH Zurich; 5 pages.
Schulzrinne, H. et al., "RTP: A Transport Protocol for Real-Time Application.", http://www.ietf.org/rfc/rfc1889.txt, (Jan. 1996),1-75.
Schulzrinne, H. et al., "RFC 2326: Real Time Streaming Protocol (RTSP)", (Apr. 1998),1-92.
Sun, H. et al., "Architectures for MPEG Compressed Bitstream Scaling", (Apr. 1996),191-199.
R. Sagroa et al - "iMash: Interactive Mobile Application Session Handoff" - UCLA - Jul. 2005.
Gregor V Bochman et al - "Quality of service management issues in electronic commerce applications", 1999.
Baochun Li et al - "An Integrated runtime QoS-aware middleare framework for distributed multimedia applications" - Multimedia Systems (2002), 2002.
Sumit Roy et al- "A System Architecture for Managing Mobiie Streaming Media Services" - Proc of the 23rd International Conference on Distributed Computing Systems Workshops (ICDCSW03) (2003), 2003.
John Sucec et al - "Location Management for Hierarchically Organized Mobile ad hoc Networks" -IEEE (2002), 2002.

* cited by examiner

SYSTEMS AND METHODS IN WHICH A PROVIDER IS SELECTED TO SERVICE CONTENT REQUESTED BY A CLIENT DEVICE

RELATED U.S. APPLICATION

This application claims priority to the provisional patent application, Ser. No. 60/471,851, entitled "Architecture for Distributing and Managing Streaming Media Services," with filing date May 19, 2003, assigned to the assignee of the present application, and hereby incorporated by reference in its entirety.

TECHNICAL FIELD

Embodiments of the present invention pertain to servicing and delivery of content over a network.

BACKGROUND ART

Typically, people learn of content sites (e.g., a video-based movie web page) based on their web browsing experiences using their desktop or laptop machines, since these devices are well suited to the input (e.g., Uniform Resource Locators or search queries) and output (e.g., reliable, high-bandwidth connections) requirements associated with web browsing. Once such sites are located, web users may subsequently try to connect to them using mobile devices such as video-enabled personal digital assistants (PDAs) or cell phones.

To accommodate the diversity in user (client) devices, content providers have to be able to support a wide range of different bit rates (according to the bandwidth of the connection), video frame rates (according to the processing power available at the client device, which itself varies dynamically according to power management strategies employed by the client device), video frame sizes (according to the display size available at the client device), or the like.

One way to address these problems is to endow the network with the ability to transcode media data as it is streamed, so that it arrives at a client device in a format that is tailored to the client device. In other words, processing is performed by the network on an input media content stream, so that an output content stream is produced with a different bit rate, video frame rate, video frame size, or other parameters, that makes the output content stream more amenable to consumption on the client device. This transcoding operation may be thought of as a service provided by the network. More generally, one might imagine that other types of media processing and analysis might also be performed within the network, so that modified content, or data derived from content available through the network, can be delivered to client devices. The ability to provide this sort of functionality in a network would enable the construction of a wide variety of useful services based on media content input, and these services could be provided for consumption by end users with access to the network.

Thus, a method and/or system that can deliver content, as well as content that results from the processing or analysis of other content, to a large number of clients without network congestion and the resulting degradation in the quality of the delivered content, would be valuable. A method and/or system that can accomplish this for diverse clients would also be of value.

DISCLOSURE OF THE INVENTION

Embodiments of the present invention pertain to methods and systems for servicing content for delivery to a client device. An item of content is identified during a session with the client device. A type of service to be performed on the item of content is identified. A provider is selected from a plurality of providers capable of performing the service. The session is transferred to the selected provider, which performs the service on the item of content.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on an intelligent device such as a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
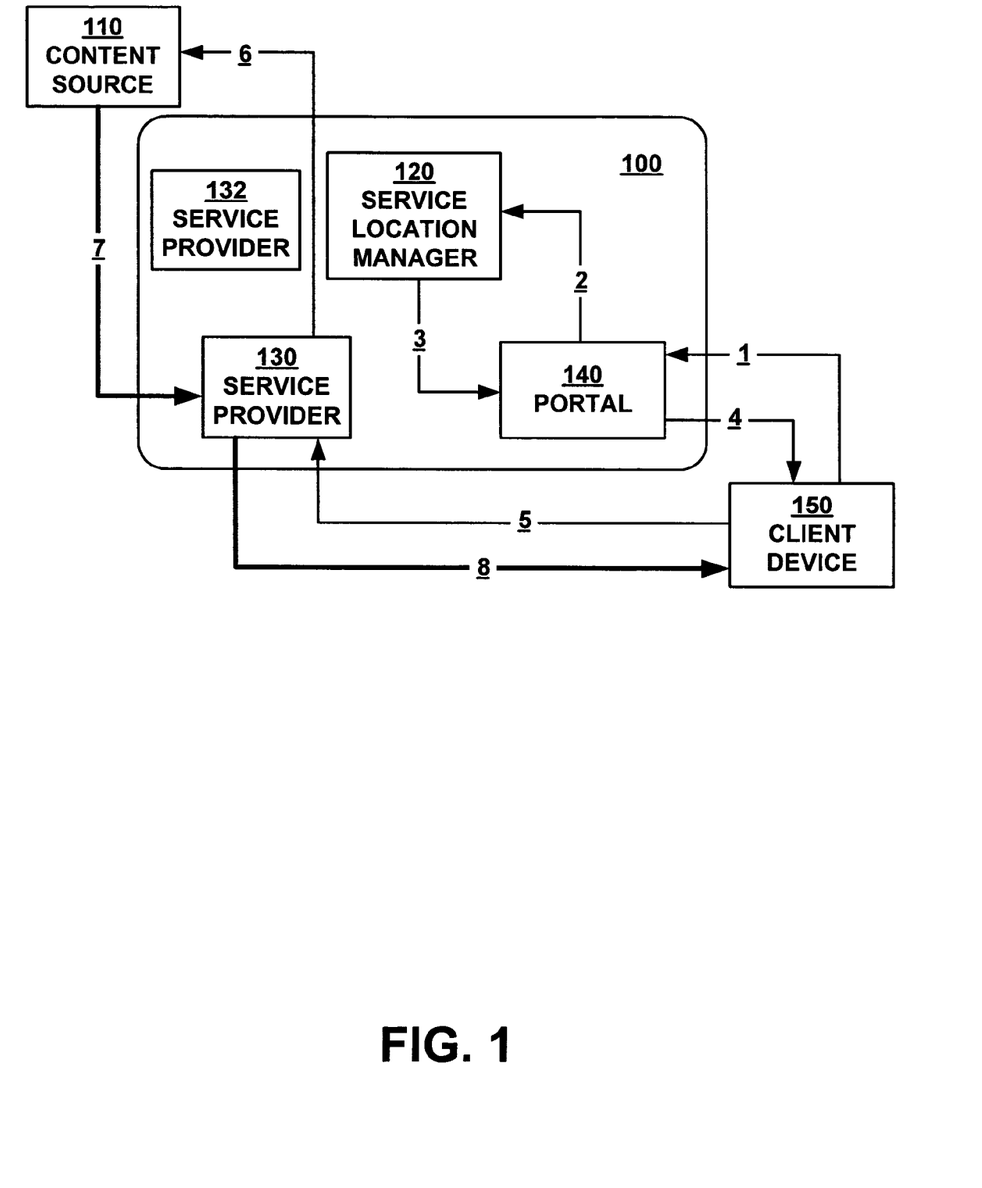
FIG. 1 is a block diagram showing information flow in and out of a system for servicing and delivering content to a client device according to one embodiment of the present invention.

FIG. 1 is a block diagram of a system 100 for servicing content from a content source 110 and for delivering the service result content to a client device 150 according to one embodiment of the present invention. In overview, a client device 150 seeking a service contacts system 100 (e.g., portal 140). The client device 150 is redirected to a provider of the service (e.g., service provider 130). Content from a content source (e.g., content source 110) is sent (e.g., streamed) to the client device via the service provider. Thus, in one embodiment, system 100 is for streaming media from a content source to a client device.

For purposes of the present application, streaming media as used herein means data that is communicated between network nodes in a continual manner. Examples include streaming audio and video, which may have strict time constraints on delivery. In these examples, if portions of these streams are delivered too late, the portions will be ignored due to tardiness (they are too late to affect what is being played by the client application and are therefore largely useless). Alternatively, if portions of these streams are delivered too early, they will be lost due to buffer constraints within the service or client application. Other examples of data that is transmitted in a continual manner include streams of measurements or streams of experimental results. These types of streams include weather readings from remote sensors and temperature readings from cooling systems. In these examples, there are no strict time constraints on the delivery; however, the data transmission has a temporal component that is best served by seamlessly ongoing transmissions.

As such, by using streaming media, the effect of service placement has a long-lived effect on resources of both the network and the server nodes. For example, in transcoding a movie for viewing under streaming conditions, the data may span as much as two hours and therefore the transcoding session may span as much as two hours of the server time. For other types of streaming (e.g., instrument readings), the duration of the stream and of the service being done on the stream can be never-ending. The computational resources of the server node are affected for long periods of time with uncertain durations. Similarly, the network resources at the server node, on all the links between the server and the content provider, and between the server and the client machine, will be affected for long periods of time with uncertain durations. This is in marked contrast to more classic network transactions in which the data transfer is done in a block, often in less than seconds or minutes and in which the service performed on that data has a constrained duration.

In an embodiment that deals with streaming media, the following are some of the issues that need to be considered; that is, in comparison to web-based distribution, and web-based business transactions and/or downloads, streaming media has the following characteristics that need to be addressed:

a large amount of data—the end point of the data may not be known, and caching a number of items of content can consume significant memory resources;

time-ordered data—the temporal order in which data is received can be important;

access may not be carried through to completion—for example, only some portion of an item of content may be accessed (e.g., the first couple of minutes of a full-length movie);

bandwidth needed cannot be determined without some degree of understanding of the subject media—for example, one video file may be at a high spatial resolution, and another video file may not, and so while the files, both being video files, may appear to be the same, their respective bandwidth may be quite different;

jitter in latency or bandwidth can be problematic—a consistent latency may be acceptable, but latency that varies considerably during a session can be problematic because of buffer overflow or underflow;

inadequate computation or bandwidth resources can make results useless due to time constraints;

data is typically encoded (compressed), and so loss or lateness of some part of the data can have consequences on subsequent data decoding (decompression);

lost data is not typically retransmitted due to time constraints; and a record of state should be maintained for all client devices—for streaming media, the streaming node needs to continue streaming data, and cannot wait to receive state information from clients.

The result of these differences is to greatly increase the need for management and monitoring of services performed on streaming media.

In the present embodiment, system 100 includes a service location manager 120, a plurality of service providers exemplified by a service provider 130 and service provider 132, and a portal 140. The service location manager 120, the service providers 130 and 132, and the portal 140 are logical entities that can be implemented on a single device or using multiple devices. Thus, system 100 can be representative of, for example, a single computer system that implements the functionality of service location manager 120, service providers 130 and 132, and portal 140. Alternatively, system 100 can encompass different nodes or devices in a computer system network. These nodes may be server computer systems, switches, routers or the like, having processing and memory capabilities sufficient to perform the various functionalities to be described herein. Generally speaking, the functionality provided by system 100 can be implemented using one or more devices. Furthermore, although system 100 is described for a single service location manager 120 and portal 140, there can be more than one of any of those elements. In addition, there can be more than two service providers.

System 100 can be implemented in an existing computer system network by overlaying the functionality of service location manager 120, service providers 130 and 132, and/or portal 140 onto the existing network. That is to say, all or a part of the functionality provided by system 100 can be incorporated into existing network nodes. Alternatively, all or part of system 100 can be implemented by adding nodes into an existing network. For example, existing content sources and portals may be used, with nodes added for servicing content and for managing service providers.

In the present embodiment, system 100 can communicate with a content source 110 and a client device 150. Although described for a single content source 110 and client device 150, there can be more than one of each of those elements. Communication between system 100, content source 110 and client device 150, as well as communication within system 100, can be wireless.

Client device 150 can be virtually any kind of user device such as, but not limited to, a desktop or laptop computer system, or a video-enabled handheld computer system (e.g., a portable digital assistant) or cell phone. In general, client device 150 is used to request and subsequently receive an item of content.

An item of content refers to media or non-media data that can be live or recorded. An item of content can include, but is not limited to, video-based data, audio-based data, image-based data, web page-based data, graphic data, text-based data or some combination thereof. For example, an item of content can be a movie of digital video disk (DVD) quality.

A type of service may need to be performed on the item of content before the content is provided to client device 150. Types of services can include the processing of an item of content and/or the analysis of an item of content. For example, types of services can include video processing such as, but not limited to, transcoding, jitter removal, dynamic clipping based on facial recognition, video analysis, resizing of the video, optical character reading from video, background removal, and the like. Additionally, types of services can include audio processing such as, but not limited to, background removal, audio enhancement, audio speed up or slow down, audio enhancement, noise reduction, speech recognition, audio analysis, and the like. The analysis of an item of content can include, for example, speech recognition that produces a text transcript, or optical character recognition applied to one or more video images of a video stream to produce a text output. A video-based person tracking service that outputs a stream of records of person location and times is another example that can be used to illustrate analysis of an item of content. The locations might be expressed in terms of image coordinates, but may be more useful when expressed in terms of physical world coordinates (e.g., "x,y" coordinates referenced to the floor of a room). Another example that can be used to illustrate an analysis of an item of content pertains to a face detector service that outputs snapshots of faces extracted from a video stream, the times and image locations at which the snapshots were detected, identities for the faces, and/or the classification of the faces. Some portion of this information can be represented as text data.

As used herein, an item of content may have been serviced, may be in the process of being serviced, may not be serviced, or may not yet be serviced. In other words, an item of content, whether serviced or not, can still be referred to as an item of content. Servicing of an item of content can include the analysis or processing of an item of content. When necessary for clarity of discussion, the result of servicing an item of content is referred to herein using terms such as "service result" or "service result content" or "service result data." Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

Continuing with reference to FIG. 1, service providers 130 and 132 each function to provide one or more types of service. That is, service providers 130 and 132 can each provide multiple and different types of services. For example, service provider 130 can be used for transcoding one item of content and for background removal of another item of content. Different types of services can be performed in parallel on different items of content. That is, service providers 130 and 132 can perform a service on different but concurrent content streams. Service providers 130 and 132 can also provide caching services. For example, service provider 130 or 132 can cache an item of content, in whole or in part, before the item of content is serviced by service provider 130 or 132. Similarly, service provider 130 or 132 can cache the service result, in whole or in part, before the service result content is forwarded to the client device 150.

Portal 140 is a well-published portal site that serves as the first point of contact between client device 150 and system 100. Content source 110 is the source of the item of content.

Service location manager 120 selects a service provider (e.g., service provider 130 or 132) that can perform the type of service that may need to be performed on the item of content before the service result is provided to the client device 150. Service providers 130 and 132, and any other available service providers, are known to service location manager 120. The type or types of services that each service provider can perform, or can be made to perform, are also known to service location manager 120. The manner in which service location manager 120 selects a service provider is more fully described below.

At the beginning of a session, client device 150 sends message 1 to portal 140. Message 1 identifies a particular item of content (e.g., the name of a movie).

Also, in one embodiment, message 1 includes information sufficient for identifying a type of service that should be performed on the item of content before the service result is delivered to client device 150. That information can take many forms. In one form, message 1 specifically identifies a type of service (e.g., background removal or speech recognition). In another form, message 1 identifies attributes of client device 150, such as its memory capacity, screen size, processing capability and the like. Based on these attributes, system 100 (e.g., portal 140) can derive a type of service that should be performed (e.g., transcoding). In yet another form, message 1 identifies the type of client device 150, and based on stored knowledge of that type of device, system 100 (e.g., portal 140) can derive a type of service that should be performed (e.g., transcoding).

Message 1 can include other information. If the source of the item of content is known by client device 150, then the content source can also be identified in message 1. For example, message 1 can include the Uniform Resource Locator (URL) for content source 110. If the source of the item of content is not known to client device 150, the content source can be located by system 100 (e.g., by portal 140) if that information is not already known to system 100.

After receiving message 1, portal 140 sends message 2 to service location manager 120. In one embodiment, message 2 includes information sufficient for identifying a type of service that should be performed on the item of content before the service result is delivered to client device 150. As just described, that information can take many forms. In one form, message 2 specifically identifies a type of service (e.g., background removal or speech recognition). In another form, message 2 identifies attributes of client device 150, such as its memory capacity, screen size, processing capability and the like. Based on these attributes, system 100 (e.g., service location manager 120) can derive a type of service that should be performed (e.g., transcoding). In yet another form, message 2 identifies the type of client device 150, and based on stored knowledge of that type of device, system 100 (e.g., service location manager 120) can derive a type of service that should be performed (e.g., transcoding). Based on the information provided by message 2, service location manager 120 identifies the type of service to be performed.

Message 2 can include other information. For example, message 2 can also identify the item of content and/or the content source.

Service providers 130 and 132, and the services they are capable of providing, are known to service location manager 120. Service location manager 120 selects either service provider 130 or 132 to perform the service identified from message 2.

In one embodiment, service location manager 120 selects either service provider 130 or 132 at random. In another embodiment, service location manager 120 selects either service provider 130 or 132 using a scheme such as a round-robin scheme.

In yet another embodiment, service location manager 120 maintains a history or record of service providers which are servicing other sessions already in progress. That is, as mentioned previously, there can be multiple client devices, each participating in a session (e.g., each requesting an item of content). For those other sessions in which the item of content is being serviced, service location manager 120 will have selected a service provider to perform the service. In the present embodiment, service location manager 120 maintains a record of the service providers that were selected to provide services for those other sessions. Based on the information in the record, service location manager 120 can select a service provider for the new session with client device 150. For example, based on the information in the record, service location manager 120 can assess which service providers are busiest relative to the other service providers. The record can include information such as the expected length of time needed to complete the service, or the expected length of time that the session will last. The record can be updated by service location manager 120 using a variety of approaches to be described further below.

In the example of FIG. 1, service location manager 120 selects service provider 130. Service location manager 120 then sends message 3 to portal 140. Message 3 includes information sufficient for locating and contacting service provider 130. For example, message 3 can include the URL for service provider 130.

Message 3 can include other information. For example, message 3 can also identify the item of content and/or the content source.

After receiving message 3, portal 140 sends message 4 to client device 150. Message 4 includes the information for locating and contacting service provider 130 that was provided by message 3. Message 4 can be identical to message 3 (message 4 may simply be a forwarding of message 3). However, message 4 can include other (additional) information added by portal 140. For example, message 4 can also identify the item of content and/or the content source if that information is determined by portal 140 instead of service location manager 120.

In an alternate embodiment, in lieu of messages 3 and 4, service location manager 120 sends a message directly to client device 150. The message from service location manager 120 to client device 150 includes the information for locating and contacting service provider 130. The message can include other information such as the identity of the item of content and/or the content source.

In any case, client device 150 receives a message that includes information sufficient for locating and contacting service provider 130. Based on that information, communication is established between client device 150 and the service provider 130. In other words, the session initiated by client device 150 is automatically transferred from portal 140 to service provider 130. Importantly, the transfer from portal 140 to service provider 130 is seamless and transparent to an end user at client device 150.

In one embodiment, the message received by client device 150 (e.g., message 4) uses or is based on Synchronized Multimedia Integration Language (SMIL). Redirection of client device 150 from portal 140 to service provider 130 can be accomplished using dynamic SMIL rewriting.

Continuing with the example in view of FIG. 1, after receiving message 4 from portal 140 (or an equivalent message from service location manager 120), client device 150 sends message 5 to service provider 130. Message 5 identifies the item of content and the type of service to be performed by service provider 130. Message 5 can include other information. For example, if the content source is known at this point to client device 150, that information can be included in message 5.

Upon receiving message 5, service provider 130 sends message 6 to content source 110. As mentioned above, content source 110 can be identified to service provider 130 in message 5. Otherwise, service provider 130 can locate content source 110. In message 6, service provider 130 requests that the item of content be provided.

In response to message 6, content source 110 sends the item of content to service provider 130 for servicing (illustrated by arrow 7 in FIG. 1). In one embodiment, the item of content is streamed to service provider 130.

In one embodiment, service provider 130 is always set up and ready to execute the specified service. That is, the specified service can be continuously executing on service provider 130, waiting for data to operate on. In another embodiment, the specified service is quiescent until either message 5 or the item of content is received by service provider 130. That is, service provider 130 may need to set up or start up the specified service, and will not do so until the potential need for the service is identified or until there is an actual need to perform the service.

In any case, service provider 130 can then perform the specified service on the item of content. The item of content can be cached by service provider 130 in whole or in part before servicing, or the item of content can be serviced as it is received by service provider 130.

The service result content is then sent by service provider 130 to client device 150 (illustrated by arrow 8 in FIG. 1). In one embodiment, the service result content is streamed to client device 150. The service result content can be cached by service provider 130 in whole or in part after servicing (before streaming), or the service result content can be streamed as it is serviced by service provider 130.

Once the service result content has been delivered by the selected service provider (e.g., service provider 130) and received by client device 150, the ongoing session can be terminated. In an embodiment in which a history or record is maintained by service location manager 120, the history or record can be updated to reflect that the service provider 130 has completed its servicing tasks or that the session has been terminated. Different approaches can be used to prompt an update of the record. In one approach, at or around the time that the service location manager 120 is making a selection of a service provider, the service location manager 120 estimates the amount of time needed to complete the service to be performed on the item of content. The record can be updated to reflect that the service has been completed when that amount of time has passed. Alternatively, the selected service provider (e.g., service provider 130) can indicate to service location manager 120 when it has completed a service, and the record can be updated accordingly. These approaches can be extended to account for the delivery of the service result content to client device 150. For example, the amount of time estimated by the service location manager 120 for service provider 130 to perform the service can be increased to account for any additional time needed by service provider 130 to send the service result content to client device 150. Similarly, service location manager 120 can estimate the length of time that the session is expected to last (e.g., if the item of content is a movie that lasts two hours, the session may be estimated as lasting about two hours). Alternatively, service provider 130 can indicate to service location manager 120 when it has completed sending the service result content to client device 150.

In the discussion above, the item of content is sent to service provider 130 in response to message 6. As mentioned previously herein, service provider 130 can instead store or cache content previously received and/or serviced, obviating the use of message 6 and the response to message 6 (e.g., obviating the data flow indicated by arrow 7 in FIG. 1).

Figure 2A:
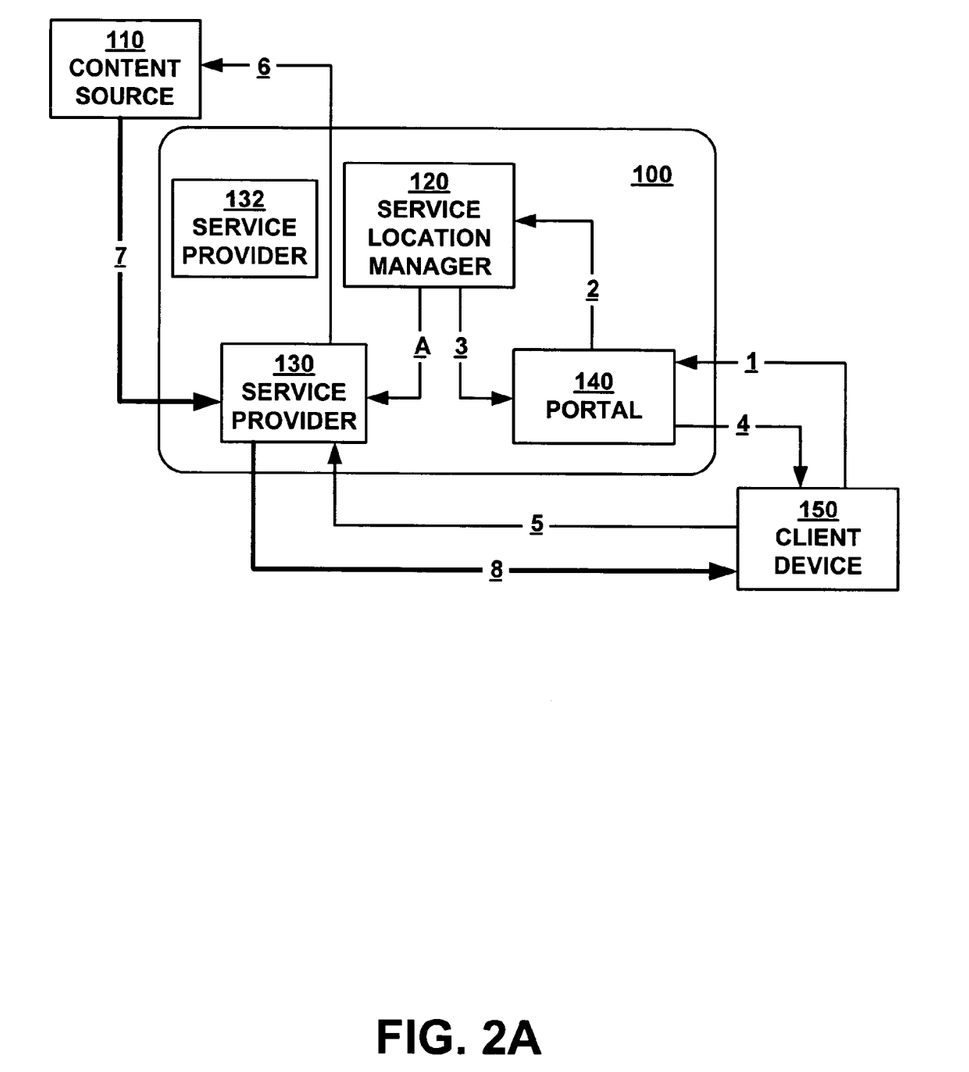
FIG. 2A is a block diagram showing information flow in and out of a system for servicing and delivering content to a client device according to another embodiment of the present invention.

FIG. 2A is a block diagram showing information flow in and out of system 100 according to another embodiment of the present invention. A difference between FIG. 1 and FIG. 2A is the addition of message A from service location manager 120 to the selected service provider (e.g., service provider 130). The message A can be sent from service location manager 120 to service provider 130 at any time after message 2 and before message 5.

Message A can be used for any number of different purposes. For example, in a situation in which the type of service to be performed on the specified item of content is not continuously executing on service provider 130, message A can be used to alert service provider 130 to the approaching need for the service. Consequently, the set up and/or start up of the service can be initiated and perhaps completed before message 5 is received from client device 150, reducing overall latency.

Also, message A can be used to provide to service provider 130 the identity of the item of content and perhaps the identity of the content source 110. With this information, service provider 130 can request content source 110 to provide (e.g., begin streaming) the item of content before message 5 is received, further contributing to a reduction in latency. In addition, the use of message A in this manner can result in improved security, because the content source 110 does not have to be identified to the client device 150, for example.

Figure 2B:
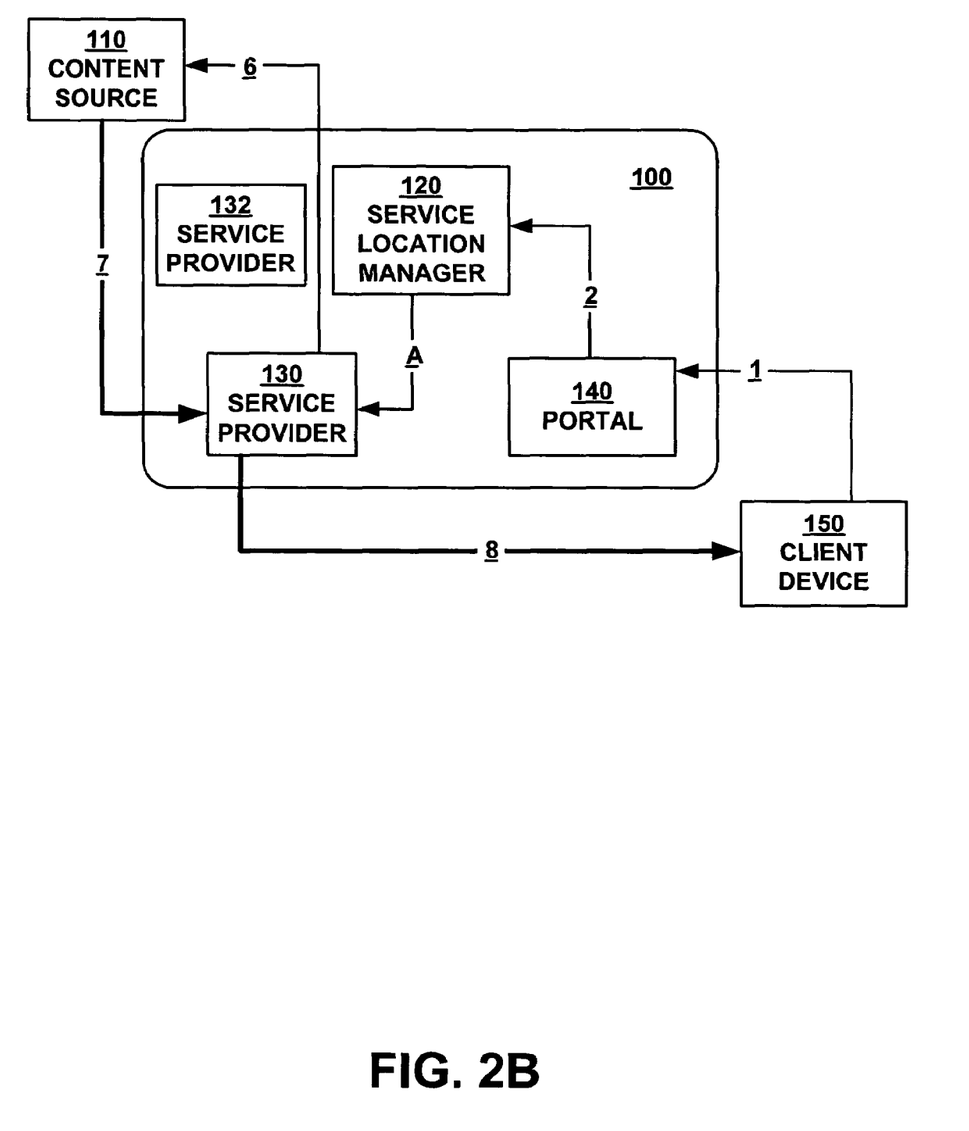
FIG. 2B is a block diagram showing information flow in and out of a system for servicing and delivering content to a client device according to yet another embodiment of the present invention.

Furthermore, message A can be used in lieu of messages 3, 4 and 5, as illustrated by FIG. 2B. For instance, in addition to identifying the item of content and perhaps the content source, message A can also include information enabling service provider 130 to establish communication with client device 150. In other words, instead of having client device 150 initiate the transfer of communication from portal 140 to service provider 130, the transfer of communication can be initiated by service provider 130 in a manner that is still seamless and transparent to a user of client device 150.

Figure 3:
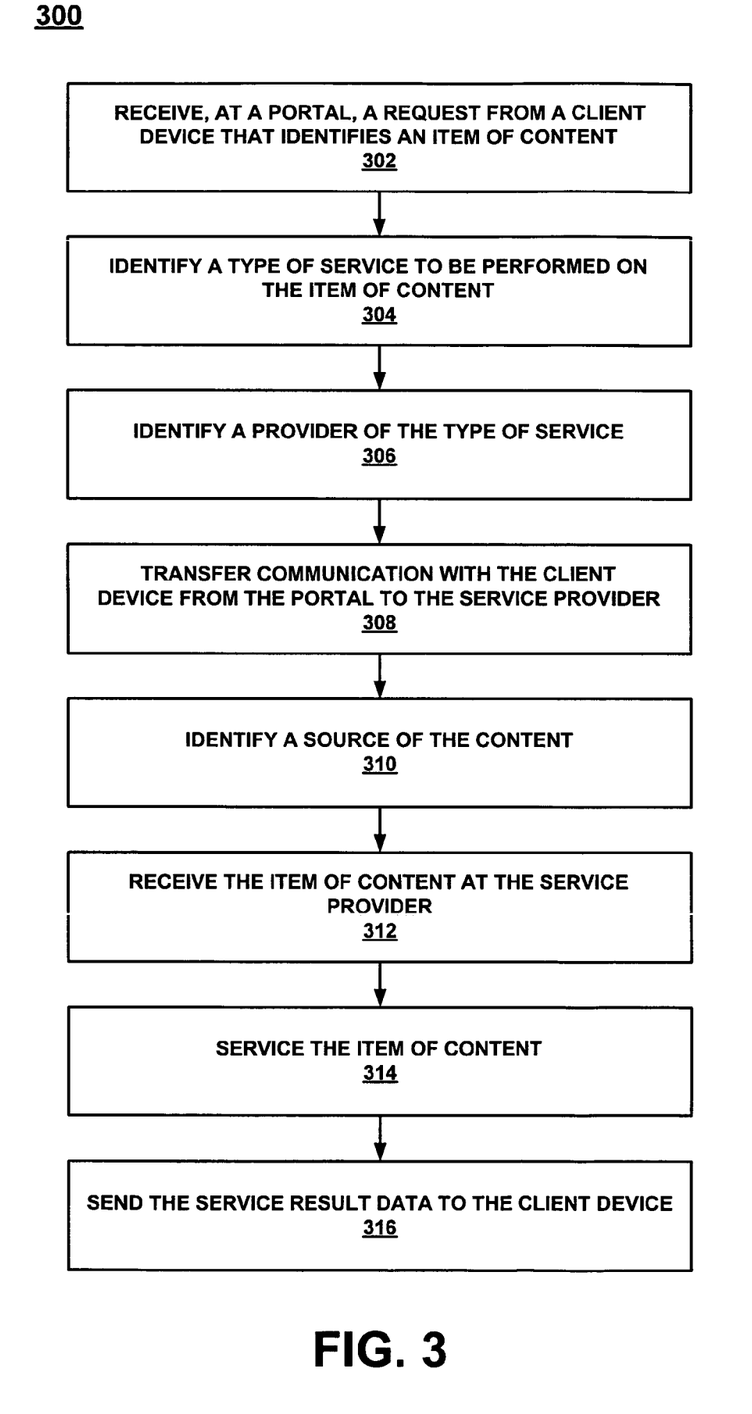
FIG. 3 illustrates a method for servicing and delivering content according to one embodiment of the present invention.

FIG. 3 is a flowchart 300 of a method for servicing and delivering service result content according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed.

All of, or a portion of, the methods described by flowchart 300 can be implemented using computer-readable and computer-executable instructions which reside, for example, in computer-usable media of a computer system or like device. In the present embodiment, flowchart 300 is implemented by system 100 of FIGS. 1, 2A and 2B. That is, some of the steps recited in flowchart 300 are performed by portal 140, others by service location manager 120, and yet others by service provider 130 of FIGS. 1, 2A and 2B.

In step 302 of FIG. 3, during a session with a client device, a portal receives a request from the client device, identifying an item of content. The request can include other information. In one embodiment, with reference to FIGS. 1, 2A and 2B, portal 140 receives message 1 from client device 150.

In step 304 of FIG. 3, a type of service to performed on the item of content is identified. The type of service can be identified in the request of step 302, or it can be derived based on information provided in that request. Referring to FIGS. 1, 2A and 2B, the type of service can be identified by the client device 150, by the portal 140, or by the service location manager 120.

In step 306 of FIG. 3, a provider of the type of service is selected from a number of providers capable of performing the service. In one embodiment, with reference also to FIGS. 1, 2A and 2B, a service provider (e.g., service provider 130) is selected by service location manager 120. As mentioned above, service location manager 120 can select a service provider at random or using a scheme such as a round-robin scheme. Alternatively, service location manager 120 can maintain a record that reflects which of the service providers other sessions have been transferred to. In this latter approach, service location manager 120 selects a service provider based on the information in the record.

In step 308 of FIG. 3, communication with the client device is transferred from the portal to the selected service provider. In other words, the session is transferred from the portal to the selected service provider.

In step 310, a source of the item of content is identified. Referring to FIGS. 1, 2A and 2B, the source of the item of content can be identified by the client device 150, by the portal 140, by the service location manager 120, or by the selected service provider (e.g., service provider 130). The content source is then contacted to begin delivery of data for the item of content to the selected service provider.

In step 312 of FIG. 3, the item of content is received by (e.g., streamed to) the selected service provider.

In step 314, the item of content is serviced according to the specified type of service. Data constituting the item of content can be serviced as the data are received at the service provider, or the data can be cached before servicing. As mentioned above, an item of content may have been serviced, may be in the process of being serviced, may not be serviced, or may not yet be serviced. Servicing of an item of content can include the analysis or processing of an item of content. Service result content may consist of: a modified version of the original serviced item of content (e.g., when background removal is applied to a video stream); an item of content that is derived from the original item of content (e.g., when optical character recognition is used to produce text output); an item of content that is passed through a service provider and is not modified but merely forwarded (e.g., content that does not require transcoding when received by a transcoding service provider); or an item of content that has been previously sent to a service provider and is now cached/stored on the service provider (e.g., content that was previously serviced and is now stored in memory at the service provider). Additionally, service result content may consist of any combination of the above examples.

In one embodiment, the service is executed continuously by the service provider. In another embodiment, the service is not set up or does not start operating until the client device establishes communication with the service provider. In yet another embodiment, the service is set up and/or starts up after the service provider is identified by the service location manager, before the client device establishes communication with the service provider. For example, with reference to FIGS. 2A and 2B, after service location manager 120 selects service provider 130 as a provider of the specified type of service, a message A is sent to service provider 130, causing service provider 130 to set up and/or start up the service.

In step 316 of FIG. 3, the service result content is sent (e.g., streamed) to the client device. The data constituting the service result can be sent as the input data are serviced, or the service result data can be cached before it is sent.

The steps 312, 314 and 316 can be performed concurrently. That is, the selected service provider (e.g., service provider 130 of FIGS. 1, 2A and 2B) can begin servicing the item of content before the entire item of content is received at service provider 130, and service result data can begin to flow out of service provider 130 before the servicing of the entire item of content is completed. Similarly, the servicing of one portion of an item of content can be in progress while the result of servicing another portion of the item of content is being received by the client device.

Once the service result content is delivered to client device 150, the session can be terminated. In an embodiment in which service location manager 120 keeps some sort of record of providers that have been assigned sessions, the record can be updated once the session is terminated or once a service provider has serviced an item of content. Approaches for updating the record have been described above.

Figure 4:
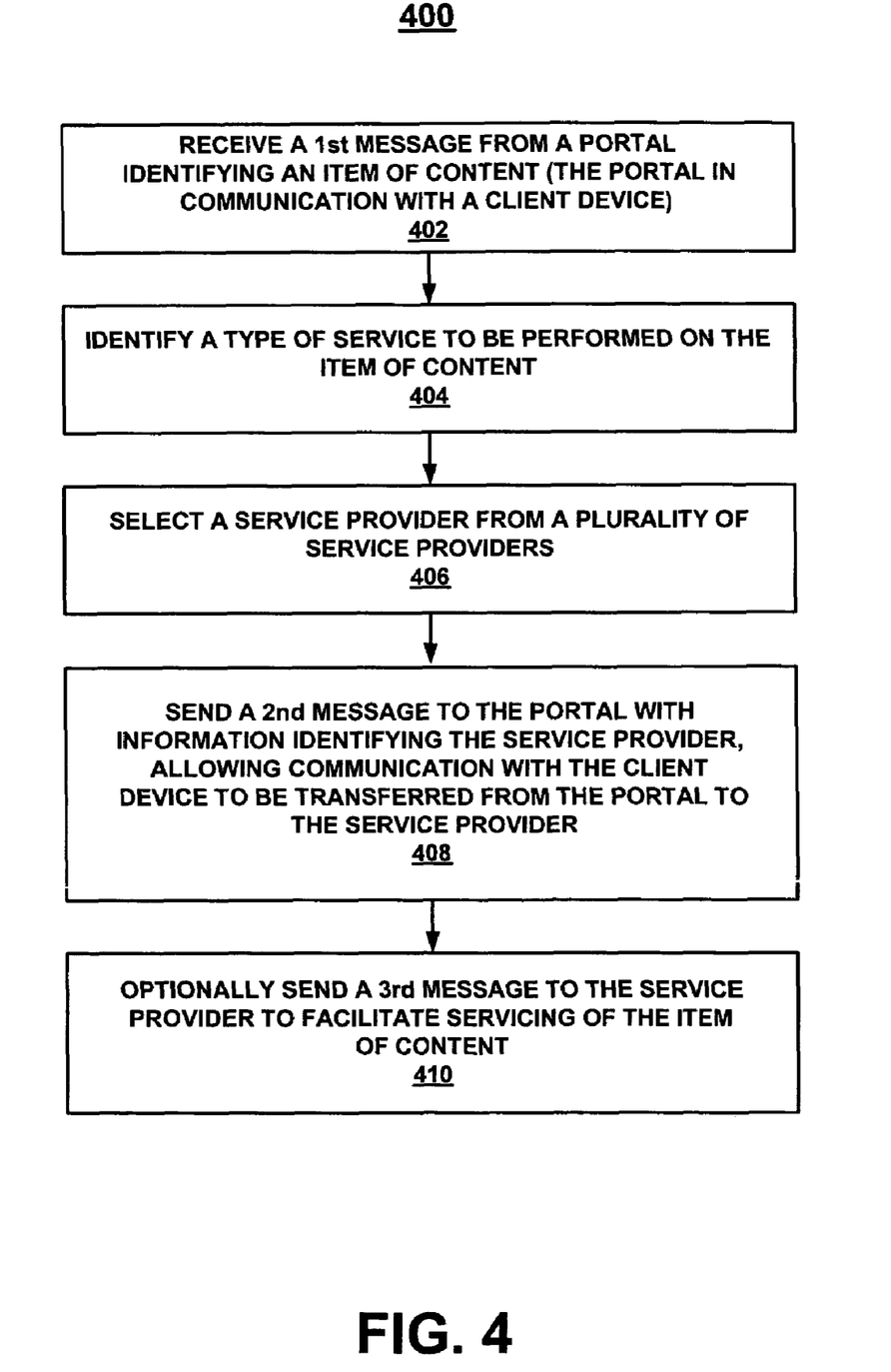
FIG. 4 illustrates a method for managing the servicing of content according to one embodiment of the present invention.

FIG. 4 is a flowchart 400 of a method for managing the servicing of content according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the methods described by flowchart 400 can be implemented using computer-readable and computer-executable instructions which reside, for example, in computer-usable media of a computer system or like device. In the present embodiment, flowchart 400 is implemented by system 100 of FIGS. 1, 2A and 2B. Specifically, flowchart 400 is implemented by service location manager 120 of FIGS. 1, 2A and 2B.

In step 402 of FIG. 4, referring also to FIGS. 1, 2A and 2B, a first message (e.g., message 2) is received from portal 140, identifying an item of content. Portal 140 is in communication with client device 150.

In step 404 of FIG. 4, referring also to FIGS. 1, 2A and 2B, a provider of a type of service to be performed on the item of content is selected (e.g., service provider 130 is selected). Approaches for selecting a service provider have been previously described herein.

In step 406 of FIG. 4, in one embodiment, a second message (e.g., message 3 of FIGS. 1, 2A and 2B) is sent to the portal. In another embodiment, the second message is sent to the client device, bypassing the portal. The second message includes information that identifies the selected service provider, allowing communication between the client device to be transferred from the portal to the service provider (e.g., from portal 140 to service provider 130 of FIGS. 1, 2A and 2B).

In step 408 of FIG. 4, in one embodiment, a third message (e.g., message A of FIGS. 2A and 2B) is sent to the selected service provider. The third message can include the identity of the item of content and/or the identity of the content source. The third message can also be used to alert the service provider, allowing the service provider to begin setting up and/or executing the service (if the service is not already executing). In response to the third message, the service provider can also contact the content source, to initiate delivery (e.g., streaming) of the item of content from the content source to the service provider. In lieu of a third message, the activities just described can begin in response to the client device and the service provider establishing communication. Service result content is then sent (e.g., streamed) from the service provider to the client device.

In summary, embodiments of the present invention provide methods and systems that can provide services to a large number of diverse client devices. A variety of services are provided to accommodate the preferences and requirements of the diverse clients. To avoid congestion, the services are provided by a number of service providers managed by a service location manager. Items of content requested by the client devices are directed to the service providers for servicing. However, the client devices need only contact a well-published portal site to begin a session and to request items of content. The client devices are automatically and transparently transferred to the appropriate service provider during the session. From the perspective of the client device, there is a single point of contact. Transparent to the client device is the flow of messages and data through the content delivery system that results in the delivery of service result content to the client device via a service provider selected by the system. Transparent to the end user at the client device is the seamless transfer of the session from the initial point of contact to the selected service provider.

The foregoing descriptions of specific embodiments of the present invention have been presented for purposes of illustration and description. They are not intended to be exhaustive or to limit the invention to the precise forms disclosed, and it is evident many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of servicing content for delivery to a client device, said method comprising:
   identifying a type of service to be performed on an item of content, wherein said item of content is identified during a session involving said client device;
   selecting a provider from a plurality of providers capable of performing said service, said selecting comprising:
      maintaining a record of providers to which sessions have been transferred;
      selecting said provider according to said record; and
      estimating an amount of time said session is expected to remain with said provider, wherein said record is updated once said amount of time has passed; and providing information for transferring said session to said provider, wherein said provider performs said service on said item of content.

2. The method of claim 1 further comprising:
receiving an indication from said provider that said service is completed, wherein said record is updated in response to said indication.

3. The method of claim 1 wherein said provider is selected according to a round-robin scheme.

4. The method of claim 1 wherein said provider is selected at random.

5. The method of claim 1 wherein said transferring comprises:
sending information for locating said provider to said client device, wherein said client device and said provider transparently establish communication.

6. The method of claim 1 further comprising:
identifying a source of said item of content, wherein data for said item of content are streamed from said source to said provider and wherein service result data are streamed from said provider to said client device.

7. A method of servicing content for streaming to a client device, said method comprising:
identifying a type of service to be performed on an item of content, wherein said item of content is identified during a session involving said client device;
selecting a provider from a plurality of providers capable of performing said service, said selecting comprising:
maintaining a record of providers to which sessions have been transferred;
selecting said provider according to said record; and
estimating an amount of time said session is expected to remain with said provider, wherein said record is updated once said amount of time has passed; and
providing information for transferring said session to said provider, wherein data for said item of content are streamed from a content source to said provider, wherein said provider performs said service on said item of content and wherein service result data are streamed from said provider to said client device.

8. The method of claim 7 wherein said provider is selected according to a round-robin scheme.

9. The method of claim 7 wherein said provider is selected at random.

10. A system for providing content to a client device, said system comprising:
a service manager device for receiving a request for an item of content from a portal, wherein said portal received said request from said client device, said service manager device also for selecting a provider from a plurality of providers, each provider capable of performing a service on said item of content, said service manager device also for maintaining a history of providers engaged in sessions, wherein said provide is selected according to said history, said service manager device also for identifying an amount of time said session is estimated to remain with said provider, wherein said history is updated in response to said amount of time transpiring, wherein a session with said client device is redirected from said portal to said provider such that said session continues via said provider, and wherein said provider performs said service on said item of content and forwards service result content to said client device.

11. The system of claim 10 wherein said service manager device maintains a history of providers engaged in sessions, wherein said provider is selected according to said history.

12. The system of claim 10 wherein said service manager device receives an indication that said service has been performed, wherein said history is updated in response.

13. The system of claim 10 wherein said provider is selected according to a round-robin scheme.

14. The system of claim 10 wherein said provider is selected at random.

15. The system of claim 10 wherein said service manager device sends information identifying said provider to said client device via said portal.

16. The system of claim 10 wherein said service manager device sends information identifying said provider directly to said client device, bypassing said portal.

17. The system of claim 10 wherein a source of said item of content is identified according to information provided in said request from said client device.

18. The system of claim 10 wherein a source of said item of content is identified by one of said portal, said service manager device and said provider.

19. The system of claim 10 wherein said item of content is streamed from a content source to said provider.

20. The system of claim 10 wherein said type of service is identified according to information provided in said request received from said client device.

21. The system of claim 10 wherein said type of service is identified by one of said portal and said service manager device.

22. The system of claim 10 wherein said service is continuously available from said provider.

23. The system of claim 10 wherein said service is started up and executed in response to said client device establishing communication with said provider.

24. The system of claim 10 wherein said service manager device directs said provider to start up said service upon selection of said provider.

25. A system for streaming content to a client device, said system comprising:
a service manager device for receiving a request for an item of content from a portal, wherein said portal received said request from said client device, said service manager device also for selecting a provider from a plurality of providers, each provider capable of performing a service on said item of content, said service manage also for identifying an amount of time said session is estimated to remain with said provider, wherein said history is updated in response to said amount of time transpiring, wherein a session with said client device is redirected from said portal to said provider such that said session continues via said provider, wherein data for said item of content are streamed from a content source to said provider, and wherein said provider performs said service on said item of content and streams service result content to said client device.

26. The system of claim 25 wherein said service manager device maintains a history of providers engaged in sessions, wherein said provider is selected according to said history.

27. The system of claim 25 wherein said service manager device receives an indication that said service has been performed, wherein said history is updated in response.

28. A computer-usable medium having computer-readable program code embodied therein for causing a computer system to perform a method for servicing content for delivery to a client device, said method comprising:
identifying a type of service to be performed on an item of content, wherein said item of content is identified during a session involving said client device;

selecting a provider from a plurality of providers capable of performing said service;

providing information for transferring said session to said provider, wherein said provider performs said service on said item of content; and estimating an amount of time said session is expected to remain with said provider, wherein a record is updated once said amount of time has passed.

29. The computer-usable medium of claim 28 wherein said computer-readable program code embodied therein causes said computer system to perform said method further comprising:

maintaining a record of providers to which sessions have been transferred; and selecting said provider according to said record.

30. The computer-usable medium of claim 28 wherein said computer-readable program code embodied therein causes said computer system to perform said method further comprising:

receiving an indication from said provider that said service is completed, wherein said record is updated in response to said indication.

31. The computer-usable medium of claim 28 wherein said computer-readable program code embodied therein causes said computer system to perform said method further comprising:

identifying a source of said item of content, wherein data for said item of content are streamed from said source to said provider and wherein service result data are streamed from said provider to said client device.

32. A computer-usable medium having computer-readable program code embodied therein for causing a computer system to perform a method for servicing content for streaming to a client device, said method comprising:

identifying a type of service to be performed on an item of content, wherein said item of content is identified during a session involving said client device;

selecting a provider from a plurality of providers capable of performing said service;

providing information for transferring said session to said provider, wherein data for said item of content are streamed from a content source to said provider, wherein said provider performs said service on said item of content and wherein service result data are streamed from said provider to said client device; and estimating an amount of time said session is expected to remain with said provider, wherein a record is updated once said amount of time has passed.

33. The computer-usable medium of claim 32 wherein said computer-readable program code embodied therein causes said computer system to perform said method further comprising:

maintaining a record of providers to which sessions have been transferred; and selecting said provider according to said record.

34. The computer-usable medium of claim 32 wherein said computer-readable program code embodied therein causes said computer system to perform said method further comprising:

receiving an indication from said provider that said service is completed, wherein said record is updated in response to said indication.

\* \* \* \* \*

UNITED STATES PATENT AND TRADEMARK OFFICE
CERTIFICATE OF CORRECTION

| | | |
|---|---|---|
| PATENT NO. | : 7,660,877 B2 | Page 1 of 1 |
| APPLICATION NO. | : 10/698810 | |
| DATED | : February 9, 2010 | |
| INVENTOR(S) | : Sumit Roy et al. | |

It is certified that error appears in the above-identified patent and that said Letters Patent is hereby corrected as shown below:

On page 2, in field (56), under "U.S. Patent Documents", column 1, line 55, delete "2004/1023684" and insert -- 2004/0236847 --, therefor.

In column 14, line 44, in Claim 25, delete "manage" and insert -- manager device --, therefor.

Signed and Sealed this

Twenty-sixth Day of October, 2010

David J. Kappos
*Director of the United States Patent and Trademark Office*